W. ROWE.
Devices for Dressing Saw-Teeth.
No. 142,176.          Patented August 26, 1873.
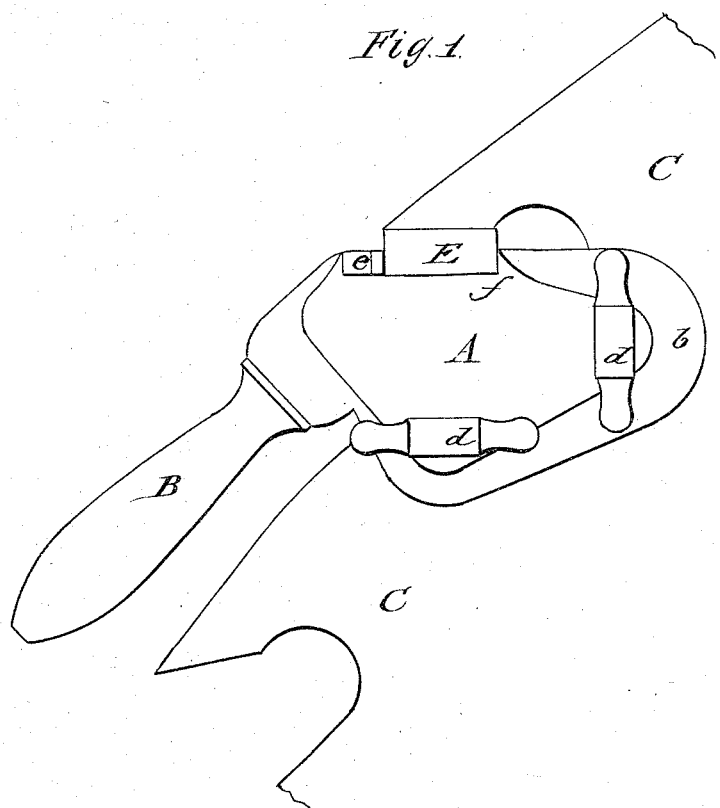
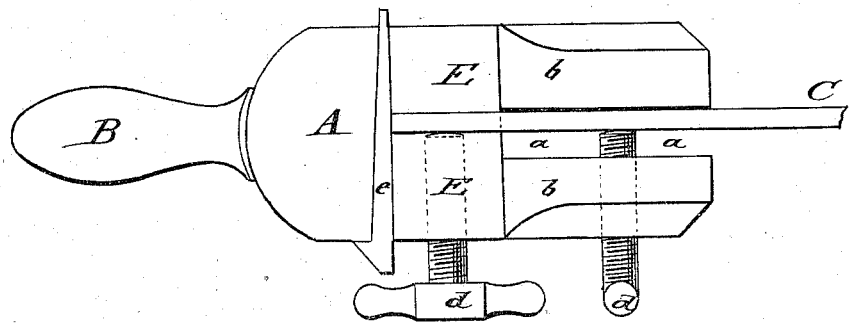
Witnesses.          Inventor.

UNITED STATES PATENT OFFICE.

WILLIAM ROWE, OF WESTERVILLE, OHIO.

IMPROVEMENT IN DEVICES FOR DRESSING SAW-TEETH.

Specification forming part of Letters Patent No. 142,176, dated August 26, 1873; application filed June 14, 1873.

*To all whom it may concern:*

Be it known that I, WILLIAM ROWE, of Westerville, in the county of Franklin and State of Ohio, have invented a new and Improved Machine for Dressing Circular-Saw Teeth, of which the following is a specification:

In the accompanying drawing, Figure 1 represents a side view of my invention as applied to a saw-tooth, and Fig. 2 is a top view of the same.

The object of my invention is to provide a machine for dressing circular-saw teeth neatly and quickly, so that it supersedes the common ordinary practice of swaging the points to widen them. My invention consists in a slotted clamp, provided with recesses to receive the saw, to which it is secured by clamp-screws, and an anvil, which is placed under a saw-tooth, and clamped in place against the same by a wedge-pin, as hereinafter more fully described.

In the drawing, A represents the clamp, of iron or other suitable material, provided with a handle, B, and applied to a circular saw, C. The clamp A has a slotted recess, $a$, of sufficient width to admit even the thickest saws in use, which recess passes centrally in a longitudinal direction through the clamp, dividing it into two parts, $b$. One part $b$ is provided with two or more strong set-screws, $d$, by which the clamp A is rigidly connected to the saw C. The handle B forms, with the clamp part of the machine, an obtuse angle almost equal to that of the tangent to the saw with the inner side of the tooth. A lateral recess, $f$, of clamp A, with slightly-inclined sides, carries the oblong steel die or anvil E, which is rigidly set into recess $f$ by means of wedge-pin $e$.

The anvil is placed directly under the inner side of the saw-tooth, so that the same rests fully thereon; then the set-screws $d$ are firmly applied to the saw, so that the tooth can be forged or dressed to the width and thickness required. The perfectly-solid bearing of the tooth on the anvil, and the strong embedding of the anvil in the clamp, which is again rigidly attached to the saw, adapts the machine fully and completely for the purposes for which it is originated.

Having thus described my invention, I claim as new and desire to secure by Letters Patent—

1. The improved machine for dressing the teeth of circular saws, consisting of clamp A with handle B, set-screws $d$, steel anvil E, and wedge piece $e$, substantially as and for the purposes described.

2. The improved clamp A, having longitudinal recess $a$ for saw, and lateral recess $f$ for anvil E, as set forth.

WILLIAM ROWE.

Witnesses:
   R. R. ARNOLD,
   CHAS. WATSON.